United States Patent [19]

Kasari et al.

[11] Patent Number: 4,530,958

[45] Date of Patent: Jul. 23, 1985

[54] THERMOSETTING METALLIC COATING COMPOSITIONS

[75] Inventors: Akira Kasari, Hiratsuka; Kazuhiko Ohira, Nagoya; Hiroshi Inoue, Hiratsuka, all of Japan

[73] Assignee: Kanzai Paint Company, Limited, Amagasaki, Japan

[21] Appl. No.: 557,833

[22] Filed: Dec. 5, 1983

[30] Foreign Application Priority Data

Dec. 7, 1982 [JP] Japan .................. 57-214495

[51] Int. Cl.³ .................. C08K 3/08; C08L 33/14; C08L 33/02; C08L 61/20
[52] U.S. Cl. .................. 524/512; 524/441; 524/315
[58] Field of Search .................. 524/441, 512, 315

[56] References Cited

U.S. PATENT DOCUMENTS

| | | | |
|---|---|---|---|
| 3,300,428 | 1/1967 | Schmidt | 524/441 |
| 3,980,602 | 9/1976 | Jakubauskas | 524/441 |
| 4,115,338 | 9/1978 | Kobayashi | 524/506 |
| 4,243,565 | 6/1981 | Nishino | 524/441 |
| 4,273,695 | 6/1981 | Greene | 524/512 |
| 4,455,331 | 6/1984 | Barsotti | 524/512 |

FOREIGN PATENT DOCUMENTS

| | | | |
|---|---|---|---|
| 0019528 | 6/1973 | Japan | 524/441 |
| 0011849 | 3/1974 | Japan | 524/441 |
| 0121831 | 11/1974 | Japan | 524/441 |

*Primary Examiner*—C. Warren Ivy
*Attorney, Agent, or Firm*—Larson and Taylor

[57] ABSTRACT

A thermosetting metallic coating composition of the organic solution type comprising a resin composition consisting of an acrylic resin and an amino resin, a metallic pigment, at least one organic solvent and water, the acrylic resin having carboxyl groups wholly or partially neutralized and the water being present in the coating composition in an amount, of about 10 to about 100 parts by weight per 100 parts by weight of the resin composition and of about 2 to about 40% by weight in the total amount of the water and the organic solvent.

7 Claims, No Drawings

THERMOSETTING METALLIC COATING COMPOSITIONS

The present invention relates to thermosetting metallic coating compositions, and more particularly to thermosetting metallic coating compositions capable of forming a coating with a metallike effect free from the mottling of simulated metallic texture, the coating having a structure in which the thin flakes of a metallic pigment contained in the coating composition are regularly orientated in parallel with the surface of an article to be coated.

Thermosetting metallic coating compositions are intended to produce a coating having an excellent metallike effect and good appearance and generally comprises a thermosetting resin, metallic pigment, solvent and the like. However, known thermosetting metallic coating compositions involve, as often pointed out, a great difficulty in invariably giving a layer outstanding in metallike effect and free from the mottling of simulated metallic texture (hereinafter referred to as metallic texture). And so far a satisfactory solution has not been proposed to the foregoing problem peculiar to the metallic coating compositions. Metallic pigments take the form of thin flakes which tend to be irregularly orientated, and the uneven orientation of the pigment flakes provides a coating with markedly irregular color tone and non-uniform brilliancy (glittering effect characteristic of a metallic coating), and thus with an uneven metallic texture. For example, when an article is covered with a coating comprising a portion (of blackish color) in which some of the pigment flakes are vertically orientated with respect to the surface of the article and another portion (of whitish color) in which the other flakes are orientated in parallel with the surface thereof, the coating is irregular in color tone and brilliancy and in metallic texture. And this is a serious defect to the metallic coating composition to which it is important to provide a coating with good appearance. A coating with the thin flakes of a metallic pigment uniformly orientated in parallel with the surface of an article exhibits a marked brilliancy and good metallike effect and has various advantages such as those of making the curved portions of the article look more attractive and preventing the transmission of light into an undercoat formed below the metallic coat.

It is said that theoretically a metallic coating composition for forming a coating free from the irregularity of metallic texture with the thin flakes of a metallic pigment orientated in parallel with the surface of an article is required to have the following properties:

1. a property of being satisfactorily atomized when applied by a spray or electrostatic coating method;
2. a high viscosity of the composition applied to the surface of the article which is sufficient to inhibit the flow of the pigment; and
3. a low content of non-volatile solids in the composition applied to the surface of the article and a property of producing a considerably great difference in the thickness between the coating formed upon application and the thermally cured coating.

Research efforts have been conducted heretofore to develop metallic coating compositions with properties of the three requisites as stated above, but failed to obtain metallic coating compositions suitable for practical use. For example, organic solvent-type metallic coating compositions are known which contain a number of organic solvents (generally hydrophobic organic solvents) each having different vaporization rates. While the metallic coating compositions of this type have the advantages of enabling a higher degree of atomization in coating procedure by incorporating a large amount of organic solvents sufficient to reduce the viscosity of the composition applied to the surface of the article (requisite 1) and lowering the content of non-volatile solids in the composition applied by using adequate organic solvents (requisite 3), the coating composition can not meet the requisite 2 because the viscosity of the composition applied is substantially in proportion to the content of non-volatile solids. Conversely a metallic coating composition having a high viscosity is satisfactory in the requisite 2, but insufficient to fulfil the requisite 1. In short, it has been found difficult to produce a metallic coating composition of this type having the properties of both the requisites 2 and 3.

Also investigations have been performed to prepare a metallic coating composition with an apparent viscosity (requisite 2) which can be increased by the inclusion of an organic or inorganic thixotropy-imparting agent into the composition containing a reduced amount of non-volatile solids (requisite 3). However, this method deteriorates the water resistance and physical properties of the coating due to the presence of the thixotropy-imparting agent.

There are known aqueous metallic coating compositions which contain water as the principal solvent. The appearance of a finished coating surface formed from the aqueous metallic coating composition, however, widely varies in quality depending on the humidity in application because of a large amount of water (over about 40% based on the weight of the composition) contained in the composition. More specifically, the composition of this type applied to the surface of an article at a high humidity tends to easily flow, whereas the same composition applied at a low humidity is likely to produce a layer with a chapped surface. This means that the aqueous metallic coating compositions requires humidity control to be strictly conducted in application and therefore entails a large amount of labor and additional equipment, hence economically undesirable.

It is an object of the present invention to provide a thermosetting metallic coating composition capable of forming a coating which is uniform and excellent in metallike color tone and brilliancy.

It is another object of the invention to provide a thermosetting metallic coating composition capable of producing a layer at variable humidities under ordinary coating conditions which layer is uniform in metallic texture with the thin flakes of a metallic pigment regularly orientated in parallel with the surface of an article.

It is a further object of the invention to provide a thermosetting metallic coating composition which enables a high degree of atomization in spray coating, which does not flow upon deposition on the surface of the article, which contains a lower amount of involatile solids while causing a significantly great difference in the thickness between the coating formed upon application and the thermally cured coating, and which is capable of producing a coating uniform in metallic color tone and brilliancy.

These and other objects and features of the present invention will become more apparent from the following description.

We have carried out intensive reasearch to develop a metallic coating composition which can meet the requisites 1 to 3 and found that such metallic coating composition can be prepared by improving an acrylic resin-type thermosetting metallic coating composition in the form of an organic solution which is commonly used in the art to provide a completely finished surface, the improvements being such that the acrylic resin contained in the coating composition is provided with carboxyl groups wholly or partially neutralized and that the composition has incorporated therein a specific amount of water. The present invention has been accomplished based on this novel finding.

The present invention provides a thermosetting metallic coating composition in the form of an organic solution comprising a resin composition consisting of an acrylic resin and an amino resin, a metallic pigment, at least one organic solvent and water, the acrylic resin having carboxyl groups wholly or partially neutralized and the water being present in the coating composition in an amount, of about 10 to about 100 parts by weight per 100 parts by weight of the resin composition and of about 2 to about 40% by weight in the total amount of the water and the organic solvent.

The components for the present thermosetting metallic coating composition will be described hereinafter in detail.

The present thermosetting metallic coating composition in the form of an organic solution essentially comprises an acrylic resin wholly or partially neutralized, an amino resin, a metallic pigment, an organic solvent and water.

Usable as the acrylic resin are those having carboxyl and hydroxyl groups in the skeleton, and more specifically, suitable acrylic resins are those having an acid value of about 5 to about 100, preferably about 5 to about 50, and a hydroxyl value of about 20 to about 200, preferably about 40 to about 100. Such acrylic resins can be easily prepared by copolymerizing a carboxyl-containing unsaturated monomer, a hydroxyl-containing unsaturated monomer and, when required, other unsaturated monomer or monomers. Examples of useful carboxyl-containing unsaturated monomers are acrylic acid, methacrylic acid, maleic acid (anhydride), fumaric acid, itaconic acid, etc. Examples of useful hydroxyl-containing unsaturated monomers are hydroxyethyl acrylate, hydroxyethyl methacrylate, hydroxypropyl acrylate, hydroxypropyl methacrylate, etc. Examples of unsaturated monomers which can be used as the other monomers when required are those copolymerizable with the carboxyl-containing unsaturated monomer and the hydroxyl-containing unsaturated monomer, such as alkyl acrylate and alkyl methacrylate both having 1 to 20 carbon atoms, styrene, acrylonitrile, vinyltoluene, vinyl chloride, cyclohexyl acrylate, acrylamide, glycidyl acrylate, vinyl isobutyl ether, N-methylolacrylamidebutyl ether, etc. The proportions of these monomers are determined so that the acrylic resin obtained has an acid value and hydroxyl value in the foregoing ranges. The average molecular weight of the acrylic resin is preferably more than about 3,000, more preferably in the range of about 4,000 to about 40,000. The acrylic resin with an acid value of less than 5 is likely to impair the stability of the composition when neutralized. With an acid value of more than 100 or a hydroxyl value of more than 200, the coating has reduced water resistance and chemical resistance, whereas a hydroxyl value below 20 may lead to the decreased curability of the coating. For these reasons, it is desired to adjust the amounts of the monomers so as to prepare an acrylic resin having an acid value and hydroxyl value in the respective ranges. Useful acrylic resins are those soluble in the presence of the organic solvent and water to be discussed later.

According to the present invention, the carboxyl-containing acrylic resin must be neutralized with a basic compound to render the resin hydrophilic. Examples of useful basic compounds are ammonia, trimethylamine, triethylamine, monoethanolamine, diethanolamine, triethanolamine, dimethyl ethanolamine, diethyl ethanolamine, dimethyl benzylamine, morpholine, etc. among which dimethyl ethanolamine is particularly preferred. A degree of neutralization is such that the acrylic resin is rendered water-soluble, water-dispersible or water-adsorbable. In other words, the neutralization is conducted to such extent that the acrylic resin and water do not undergo phase-separation, more specifically the resin has a neutralization value of about 5 to about 50, preferably about 15 to about 50.

According to the present invention, the amino resin acts as a cross linking agent on the acrylic resin. Useful amino resins include di-, tri-, tetra-, penta-, and hexa-methylolmelamine, alkoxy ($C_{1-5}$) methylmelamine, melamine having a methylol group and alkoxy group ($C_{1-5}$), urea-formaldehyde condensate, urea-melamine copolycondensate, among which melamine formaldehyde etherified with $C_{1-5}$ alcohol is particularly preferred.

Metallic pigments useful in the present invention include those known per se, such as flake-shaped metallic particles of aluminum, copper, brass, micaceous iron oxide, bronze, stainless steel and the like which have an ordinary particle size.

Hydrophilic organic solvents are preferably used in this invention to stabilize the metallic coating composition which is required to include a specific amount of water. More preferably a slowly volatile solvent is used conjointly with a rapidly volatile solvent. The term hydrophilic solvent used herein refers to an organic solvent which can be dissolved in water at an ambient temperature in an amount of about over 50 parts by weight per 100 parts by weight of the water.

Slowly volatile hydrophilic organic solvents useful in this invention are those having a vapor pressure of less than 7.5 mmHg at 20° C. among which the solvents with a solubility parameter of more than 9.0 are preferred. Examples of such solvents are ethylene glycol monomethyl ether, ethylene glycol monoethyl ether, ethylene glycol monoisopropyl ether, ethylene glycol monobutyl ether, diethylene glycol monomethyl ether, diethylene glycol dimethyl ether, diethylene glycol monoethyl ether, diethylene glycol monopropyl ether, diethylene glycol monobutyl ether, etc. Useful rapidly volatile hydrophilic organic solvents are those having a vapor pressure of over 7.5 mmHg at 20° C. among which the solvents with a solubility parameter of more than 9.0 are preferable. Examples of such solvents are methanol, ethanol, n-propanol, iso-propanol, tert-butanol, acetone, etc.

It is favorable to use at least one species selected from any one or both of the above exemplified two kinds of hydrophilic organic solvents. The conjoint use of these two kinds of the solvents gives a coating of smooth texture and provides, even at variable temperature and humidities in application, with a layer having a uniformly finished surface. To achieve these effects, the proportions of slowly volatile and rapidly volatile hydrophilic solvents are adjusted to use about 5 to about 70% by weight, more preferably about 15 to about 60% by weight, of the former and about 30 to about 95% by weight, preferably about 40 to about 85% by weight, of the latter, both based on the total amount of the two solvents.

With the present invention, a rapidly volatile hydrophobic organic solvent having a lower solubility to water lower than those of the foregoing hydrophilic solvents and a vapor pressure of more than 7.5 mmHg at 20° C. can be used in an amount of less than 1,000 parts by weight, preferably 50 to 500 parts by weight, per 100 parts by weight of the above hydrophilic solvent. Examples of useful hydrophobic solvents are toluene, methyl acetate, ethyl acetate, butyl acetate, methyl ethyl ketone, sec-butanol, n-butanol, isobutanol, mineral spirit, etc.

Together with the above solvent, water must be incorporated as a solvent into the present coating composition. Although deionized water is most preferable, tap water will suffice.

While the proportions of the components for the present metallic coating composition being applied can be suitably determined according to a specific application and a coating method, preferred amounts of the components are as described hereinafter.

With respect to the acrylic resin and amino resin, the latter is used in an amount of about 5 to about 70 parts by weight, preferably about 20 to about 55 parts by weight, per 100 parts of the former. With the amino resin content lower than in this range, the water resistance and adherence of the coating is likely to deteriorate. Water is employed in an amount of about 10 to about 100 parts by weight, preferably about 30 to about 80 parts by weight, per 100 parts by weight of the resin composition consisting of an acrylic resin and an amino resin, and in an amount of about 2 to about 40% by weight, preferably about 2 to about 20% by weight, based on the total amount of the water and organic solvent (in other words, about 98 to about 60% by weight, preferably about 98 to 80% by weight of the solvent is used based on the total amount of the water and solvent). With a higher water content than in this range, the deposit on the surface of an article tends to flow of trickle down because of the reduced viscosity of the composition, thereby causing undesirable mottling of metallic texture. A suitable amount of the metallic pigment is about 5 to about 20 parts by weight per 100 parts by weight of the amino-acrylic resin composition.

When required, a coloring pigment, extender pigment, thixotropy-imparting agent, accelerator of hardening and like additives can be incorporated in the metallic coating composition of the present invention.

The present metallic coating composition can be prepared by mixing and dispersing the components in the conventional manner. The neutralization of the carboxyl-containing acrylic resin is preferably conducted before mixing with the other components, although it may be satisfactorily feasible during or after mixing therewith.

Since the present metallic coating composition is generally applied by a spray, it is preferable to adjust the content of involatile solids to about 15 to about 50% by weight, particularly about 15 to about 30% by weight. Usable as the applicator are an air spray, airless spray, electrostatic coater, etc.

The present metallic coating composition is applicable by the above coater under ordinary coating conditions (such as amount of application, temperature, humidity, etc.). The layer formed from the present coating composition is 15 to 25μ thick when dried. The deposit on the article is cured in the usual manner at about 100° to about 180° C. by application of heat for about 15 to about 45 minutes.

Although a metallic coating is formable only from the present metallic coating composition, a clear coating composition is preferably applied over the coating from the present coating composition before or after thermally hardening the metallic coating and then the coat from the clear coating composition is thermally cured. The coating method involving two layers baked at one time gives a coating of good appearance with a remarkable brilliancy and uniform color tone free from the mottling of metallic texture. Useful clear coating compositions include those having the form of an organic solution, aqueous form, water-nondispersible form, powder form and the like which dominantly contain an acrylic resin or alkyd resin.

The present invention solves the problem in respect of the unevenness of metallic texture which otherwise would be caused by an amino-acrylic resin-type thermosetting metallic coating composition in the form of an organic solution. The feature of the present invention is that the carboxyl groups present in the acrylic resin are wholly or partially neutralized and that a specific amount of water is included in the coating composition. This feature leads to the preparation of the present metallic coating composition which have the properties of the requisites 1 to 3 and which is capable of producing a layer having uniform metallic color tone and good metallike effect with the thin flakes of a metallic pigment regularly orientated substantially in parallel with the surface of an article.

The present coating composition can achieve a high degree of atomization in spray coating (requisite 1) by adding an organic solvent or the like to reduce the viscosity of the composition. Generally the coating composition deposited on the surface of an article becomes more viscous than before application because the solvent in the composition partially evaporates in the course of the coating operation. Despite a low content of non-volatile solids, the present coating composition remains highly viscous after deposition because of a specific amount of water present in the composition (requisite 2). Thus even when applied over the vertically extending surface of an article, the present composition is kept from flowing or trickling down and maintains the metallic pigment as uniformly distributed. The deposit on the article is thermally hardened, whereby a layer is produced which has a thickness considerably reduced from that of the deposit before hardening due to the low content of non-volatile solids and in which the think flakes of the metallic pigment orientated, before hardening, substantially with respect to the surface of the article have been caused to orientate practically in parallel therewith as the solvents evaporate.

The present invention is described below in more detail with reference to the following Examples and Comparison Examples in which the percentages and parts are all by weight unless otherwise specified.

I. EXAMPLES FOR PREPARATION OF ACRYLIC RESINS (1) Acrylic resin solution A-1

Monomer components, namely 15 parts of styrene, 15 parts of methyl methacrylate, 53 parts of n-butyl methacrylate, 15 parts of 2-hydroxyethyl methacrylate and 2 parts of acrylic acid, were subjected to solution polymerization in 42 parts of ethylene glycol monoethyl ether to provide a copolymer (70% solids). To the copolymer was added 58 parts of iso-propanol to obtain an acrylic resin solution A-1 (50% solids).

The acrylic resin was found to have an acid value of 16, a hydroxyl value of 64.5 and an average molecular weight of about 25,000.

(2) Acrylic resin solution A-2

Monomer components, namely 30 parts of styrene, 10 parts of methyl methacrylate, 44 parts of n-butyl methacrylate, 10 parts of 2-hydroxyethyl methacrylate and 6 parts of acrylic acid, were subjected to solution polymerization in 42 parts of iso-butanol to provide an acrylic resin solution A-2 (70% solids).

The acrylic resin was found to have an acid value of 47, a hydroxyl value of 43 and an average molecular weight of about 15,000.

(3) Acrylic resin solution A-3

Monomer components, namely 10 parts of styrene, 57 parts of n-butyl acrylate, 20 parts of 2-ethylhexyl acrylate, 10 parts of 2-hydroxyethyl acrylate and 3 parts of acrylic acid, were subjected to solution polymerization in 42 parts of iso-butanol to give an acrylic resin solution A-3 (70% solids).

The acrylic resin was found to have an acid value of 23, a hydroxyl value of 48 and an average molecular weight of about 5,000.

II. EXAMPLES 1 TO 4 AND COMPARISON EXAMPLES 1 TO 7

The components in the amounts (part by weight) as shown in Table 1 below were mixed together in the usual manner to produce metallic coating compositions.

TABLE 1

|  | Example | | | | Comparison Example | | | | | | |
|---|---|---|---|---|---|---|---|---|---|---|---|
|  | 1 | 2 | 3 | 4 | 1 | 2 | 3 | 4 | 5 | 6 | 7 |
| Acrylic resin solution A-1 | 140 | 140 |  |  | 140 | 140 | 140 |  | 140 |  | 140 |
| Acrylic resin solution A-2 |  |  | 100 | 100 |  |  |  |  |  | 100 |  |
| Acrylic resin solution A-3 |  |  |  |  |  |  |  | 100 |  |  |  |
| Uvan 20 SE (*1) | 50 | 50 | 50 | 50 | 50 | 50 | 50 | 50 | 50 | 50 | 50 |
| Aluminum #4919 (*2) | 10 | 10 | 10 | 10 | 10 | 10 | 10 | 10 | 10 | 10 | 10 |
| Stapa Mobil 801 (*3) | 10 | 10 | 10 | 10 | 10 | 10 | 10 | 10 | 10 | 10 | 10 |
| Bentone 27 (*4) |  |  |  | 1.5 |  |  |  |  |  |  |  |
| iso-Butanol | 40 | 40 | 40 | 40 | 40 | 40 | 40 | 40 | 40 | 40 |  |
| Dimethylethanolamine | 1.8 | 1.8 | 5.0 | 5.0 | 1.8 | 1.8 | 1.8 | 2.6 | 1.8 | 5.0 |  |
| Deionized water | 30 | 50 | 60 | 70 | 8 | 105 | 4.5 | 90 | 193 | 381 |  |
| Solvent mixture (*5) | 284.2 | 151 | 239 | 287 | 193 | 209.2 | 309.7 | 18 | 121.2 |  | 168.5 (*6) |
| Xylene |  |  |  |  |  |  |  |  |  |  | 30 |
| Total | 566 | 452.8 | 514 | 573.5 | 452.8 | 566 | 566 | 320.6 | 566 | 566 | 408.5 |
| non-volatile solids content (%) | 20 | 25 | 22 | 20 | 25 | 20 | 20 | 35 | 20 | 20 | 27 |
| Water content (per 100 parts of resin composition) | 30 | 50 | 60 | 70 | 8 | 105 | 45 | 90 | 193 | 381 | 0 |
| Water content in total amount of water and organic solvent (%) | 6.6 | 14.8 | 15.1 | 15.4 | 2.3 | 23.2 | 1 | 43.9 | 42.7 | 85 | 0 |
| Neutralization value for acrylic resin | 16 | 16 | 47 | 47 | 16 | 16 | 16 | 23 | 16 | 47 | 0 |

(*1) Uvan 20 SE: tradename, product of Mitsui Toatsu Kagaku K.K., Japan, n-butanol solution containing butyl-etherified melamine resin (60% solids);
(*2) Aluminum #4919: tradename, product of Toyo Aluminum K.K., Japan, aluminum powder paste (66% solids) containing mineral spirit as a solvent;
(*3) Stapa Mobil 801: tradename, product of Eckart, Japan, aluminum powder paste (66% solids) containing aliphatic hydrocarbon as a solvent non-leafing product having a particle size of 400 mesh class;
(*4) Bentone 27: tradename, product of National Lead Co., U.S.A. thixotropic-imparting agent which is an organic derivative of a special magnesium montmorillonite typically having an ultimate particle size of 0.5–1.0 micron by 0.002–0.004 micron thick;
(*5) Solvent mixture: a solvent mixture comprising 40% isobutyl alcohol, 15% ethylene glycol monobutyl ether, 20% isopropyl alcohol and 25% ethyl acetate;
(*6) A dilution solvent comprising toluene, xylene and Swasol #1000 (wt. ratio of 40:40:20).

III. RESULTS OF PERFORMANCE TEST

A primer coating composition and a coating composition for an inner coat were applied to a 8-mm-thick steel panel and dried, and the inner coat was polished with sandpaper. Each of the metallic coating compositions obtained in the Examples and Comparison Examples were applied over the polished coat by an air spray to form a layer which has a thickness of 15 to 20μ when dried. The panel with the coating was left to stand at room temperature for 3 minutes and then a clear coating composition (having a composition to be described later) was applied over the metallic coat in the same manner as above to give a dried coat 30 to 35μ in thickness. The coated panel was allowed to stand at room temperature for 10 minutes and baked at 140° C. for 30 minutes to simultaneously cure the two layers. Table 2 below shows the performance of the coating (mainly metallic effects), the viscosity of the metallic coating composition, etc.

TABLE 2

| Properties of Coating Comp. | Example | | | | Comparison Example | | | | | | |
|---|---|---|---|---|---|---|---|---|---|---|---|
|  | 1 | 2 | 3 | 4 | 1 | 2 | 3 | 4 | 5 | 6 | 7 |
| In application | | | | | | | | | | | |
| non-volatile solids | 20 | 25 | 22 | 20 | 25 | 20 | 20 | 35 | 20 | 20 | 27 |

TABLE 2-continued

| Properties of Coating Comp. | Example | | | | Comparison Example | | | | | | |
|---|---|---|---|---|---|---|---|---|---|---|---|
| | 1 | 2 | 3 | 4 | 1 | 2 | 3 | 4 | 5 | 6 | 7 |
| content (%) (*1) | | | | | | | | | | | |
| Viscosity (P/25° C.) (*2) | 0.6 | 0.6 | 0.6 | 0.7 | 0.6 | 0.7 | 0.6 | 0.6 | 0.7 | 0.7 | 0.6 |
| Upon application | | | | | | | | | | | |
| non-volatile solids content (%) (*3) | 39.6 | 39.0 | 37.5 | 36.8 | 40.4 | 37.1 | 41.3 | 47.2 | 35.0 | 33.4 | 42.5 |
| Viscosity (P/25° C.) (*4) | 6200 | 7900 | 8800 | 11000 | 2100 | 3800 | 1200 | 380 | 520 | 410 | 3200 |
| Performance of coating | | | | | | | | | | | |
| Mottling of metallic texture (*5) | A | A | A | A | B | B | C | C | C | D | C |
| Metallic color (white) (*6) | 63.72 | 64.10 | 65.41 | 64.85 | 60.15 | 59.51 | 57.30 | 52.15 | 52.30 | 51.50 | 60.20 |
| Gloss (*7) | 95.0 | 96.2 | 95.8 | 94.8 | 94.6 | 94.1 | 94.5 | 90.5 | 90.1 | 81.0 | 95.2 |
| Stability of coating comp. (*8) | A | A | A | A | A | B | A | C | C | C | A |

(*1) Content of non-volatile solids (%): The content of involatile solids in the metallic coating compositions as shown in Table 1 which each have a viscosity adjusted for application by an air spray was measured according to JIS K 5400 8.2 (residue after heating).

(*2) Viscosity: The viscosity of each coating composition shown in Table 1 was measured by a B-type viscosimeter at 60 rpm and 25° C.

(*3) Content of non-volatile solids (%): The coating composition shown in Table 1 and applied over the surface of the coated panel was collected 30 seconds after the application and measurement was conducted in the same manner as in (*1).

(*4) Viscosity: The coating composition shown in Table 1 and applied over the surface of the coated panel was collected and the viscosity of the collected composition was measured by a cone-plate-type viscosimeter.

(*5) Mottling of metallic texture: A portion (30 × 45 cm) of the coated surface was observed with unaided eye to evaluate the result according to the following criteria:
  A: The thin flakes of the metallic pigment were uniformly orientated with respect to the article surface and no mottling of metallic texture was seen.
  B: The mottling of metallic texture was clearly seen.
  C: A ⅓ to ½ portion of the surface was found irregular in metallic texture.
  D: The mottling of metallic texture was seen over almost entire surface.

(*6) Metallic color (white): The color of the coating was measured by a color-difference meter to obtained a value L. The degree of whiteness is increased with the increase of the L value.

(*7) Gloss: Measured at a reflexibility of 20 degrees.

(*8) Stability of the coating composition: The coating composition having a viscosity adjusted by the above-mentioned solvent mixture to 15 seconds (20° C.) with Ford Cup #4 was left to stand at room temperature for 24 hours and then was tested for sedimentation of the pigment and the ability to redisperse. The result was evaluated according to the following criteria:
  A: No sedimentation was observed.
  B: Although the aluminium pigment was seen sedimenting, redispersion was possible.
  C: The aluminium pigment was sedimented to a considerable extent (to separation into two phases) and redispersion was difficult.
  D: The aluminium pigment was exceedingly sedimented and redispersion was impossible.

Formulation of clear coating composition

The clear coating composition was prepared by mixing together 117 parts of xylene solution (60% solids) containing an acrylic resin (comprising 20 parts of styrene, 10 parts of methyl methacrylate, 52 parts of n-butyl methacrylate, 15 parts of 2-hydroxyethyl methacrylate and 3 parts of acrylic acid and having an average molecular weight of 15,000, acid value of 23 and hydroxyl value of 65), 50 parts of Melan 28 (tradename, product of Hitachi Kasei K.K., Japan, a solution containing 60% melamine formaldehyde resin), 1 part of an ultraviolet absorber, 23 parts of xylol and 9 parts of toluene and adjusting the viscosity of the resulting mixture to 25 seconds (Ford Cup #4) with Swasol #1000.

We claim:

1. A thermosetting metallic coating composition in the form of an organic solution comprising a resin composition consisting of an acrylic resin and an amino resin, the amino resin being present in an amount of from 5 to 70 parts by weight per 100 parts by weight of the acrylic resin, a metallic flake pigment, at least one organic solvent and water, the acrylic resin having carboxyl groups on the resin skeleton wholly or partially neutralized, said acrylic resin, prior to neutralization, having an acid value of 5 to 100 and a hydroxyl value of 20 to 200 and the water being present in the coating composition in an amount of about 10 to about 100 parts by weight per 100 parts weight of the resin composition and of about 2 to about 40% by weight of the total amount of the water and the organic solvent, the amount of solvent being correspondingly from 98 to 60% by weight based on the total amount of the water and solvent, and the non-volatile solids content of the composition being from 15 to 50% by weight.

2. A thermosetting metallic coating composition as defined in claim 1 in which the acrylic resin has a neutralization value of 5 to 50.

3. A thermosetting metallic coating composition as defined in claim 1 in which the acrylic resin is a copolymer of carboxyl-containing unsaturated monomer, hydroxyl-containing unsaturated monomer, and when required, other monomer or monomers copolymerizable with said monomers.

4. A thermosetting metallic coating composition as defined in claim 1 in which the carboxyl-containing unsaturated monomer is at least one species selected from the group consisting of acrylic acid, methacrylic acid, maleic acid or maleic anhydride, fumaric acid and itaconic acid.

5. A thermosetting metallic coating composition as defined in claim 1 in which the hydroxyl-containing unsaturated monomer is at least one species selected from the group consisting of hydroxyethyl acrylate, hydroxyethyl methacrylate, hydroxypropyl acrylate and hydroxypropyl methacrylate.

6. A thermosetting metallic coating composition as defined in claim 1 in which the resin composition contains 5 to 70 parts by weight of the amino resin per 100 parts by weight of the acrylic resin.

7. A thermosetting metallic coating composition as defined in claim 1 in which the organic solvent is at least one of a slowly volatile hydrophilic organic solvent having a vapor pressure of less than 7.5 mmHg at a temperature of 20° C. and a rapidly volatile hydrophilic and/or hydrophobic organic solvent having a vapor pressure of more than 7.5 mmHg at a temperature of 20° C., the hydrophilic solvent being soluble in water at ambient temperature in an amount of over 50 parts by weight per 100 parts by weight of water, and the hydrophobic solvent having a lower solubility to water than the hydrophilic solvent, the slowly volatile solvent being present in an amount of from 5 to 70% by weight and the rapidly volatile solvent being present in an amount of from 95 to 30% by weight, both based on the total amount of the two solvents.

* * * * *